(12) United States Patent
Wong et al.

(10) Patent No.: US 8,670,141 B2
(45) Date of Patent: Mar. 11, 2014

(54) PRINTER MANAGEMENT SYSTEM WORKING WITH INTEGRATED MANAGEMENT SYSTEM

(75) Inventors: Lana Wong, Randolph, NJ (US); Hiroshi Kitada, Tuckahoe, NY (US)

(73) Assignees: Ricoh Company, Ltd., Tokyo (JP); Ricoh Americas Corporation, West Caldwell, NJ (US)

( * ) Notice: Subject to any disclaimer, the term of this patent is extended or adjusted under 35 U.S.C. 154(b) by 415 days.

(21) Appl. No.: 13/039,873

(22) Filed: Mar. 3, 2011

(65) Prior Publication Data

US 2012/0224216 A1    Sep. 6, 2012

(51) Int. Cl.
*G06F 3/12*    (2006.01)

(52) U.S. Cl.
USPC ............................ 358/1.15; 358/1.1; 358/434

(58) Field of Classification Search
USPC ......... 358/1.1, 1.15, 400, 401, 434, 442, 468, 358/296
See application file for complete search history.

(56) References Cited

U.S. PATENT DOCUMENTS 7,779,108 B2 *  8/2010  Kawai ........................... 709/223
7,916,324 B2 *  3/2011  Tanaka ......................... 358/1.15

\* cited by examiner

*Primary Examiner* — Thomas D Lee
(74) *Attorney, Agent, or Firm* — Oblon, Spivak, McClelland, Maier & Neustadt, L.L.P.

(57) ABSTRACT

A printing system including: a print management system that includes a first type of printer, and a printer management client device that periodically reads data about first type of printer from the first type of printer; and an environment management system that includes an integration device that periodically retrieves the data about the first type of printer from the printer management system, a data storage unit that receives the data about the first type of printer from the integration device, and a second type of printer that provides data about the second type of printer to the data storage unit, wherein the second type of printer has a management function that is configured to provide the data about the second type of printer to the data storage unit in the environment management system, and the first type of printer does not have the management function.

11 Claims, 10 Drawing Sheets

PRINTER MANAGEMENT SYSTEM WORKING WITH INTEGRATED MANAGEMENT SYSTEM

BACKGROUND

1. Field of the Invention

The present application relates to a system and method of integrating a print management system and an environment management system so that data read from printers on either system can be merged into a common view for the user.

2. Discussion of the Related Art

There may be different types of management systems for a specified scope of management or for providing a wider scope of management. A specified scope of management may include a printer management system that manages a fleet of printers. A wider range of management may include management of an infrastructure of a city including building management, traffic signal management, central heating/cooling system management, energy management, and so on. The wider range management system may also include management of a fleet of printers.

Thus, there may be two separately managed sets of printers: one set under a printer management system and another set under the wide range management system. Thus, there is a need to integrate the managed data of the printers under the printer management system with the managed data of the printers in the wide range management system, so that both sets of managed printer data can be viewed on only one system.

BRIEF SUMMARY

According to one embodiment, a printing system is provided that includes a print management system, including a first type of printer, and a printer management client device that periodically reads data about first type of printer from the first type of printer; and an environment management system, including an integration device that periodically retrieves the data about the first type of printer from the printer management system, a data storage unit that receives the data about the first type of printer from the integration device, and a second type of printer that provides data about the second type of printer to the data storage unit, wherein the second type of printer has a management function that is configured to provide the data about the second type of printer to the data storage unit in the environment management system, and the first type of printer does not have the management function.

According to another embodiment, a method is provided that is implemented on a printing system that includes a print management system and an environment management system, comprising: at the print management system, periodically reading data about a first type of printer from the first type of printer; and at the environment management system, periodically retrieving the data about the first type of printer from the printer management system, storing the data about the first type of printer at a data storage unit, and at a second type of printer, providing data about the second type of printer to the data storage unit, wherein the second type of printer has a management function that is configured to provide the data about the second type of printer to the data storage unit in the environment management system, and the first type of printer does not have the management function.

DETAILED DESCRIPTION

Hereinafter, embodiments will be described with reference to the attached drawings.

Figure 1:
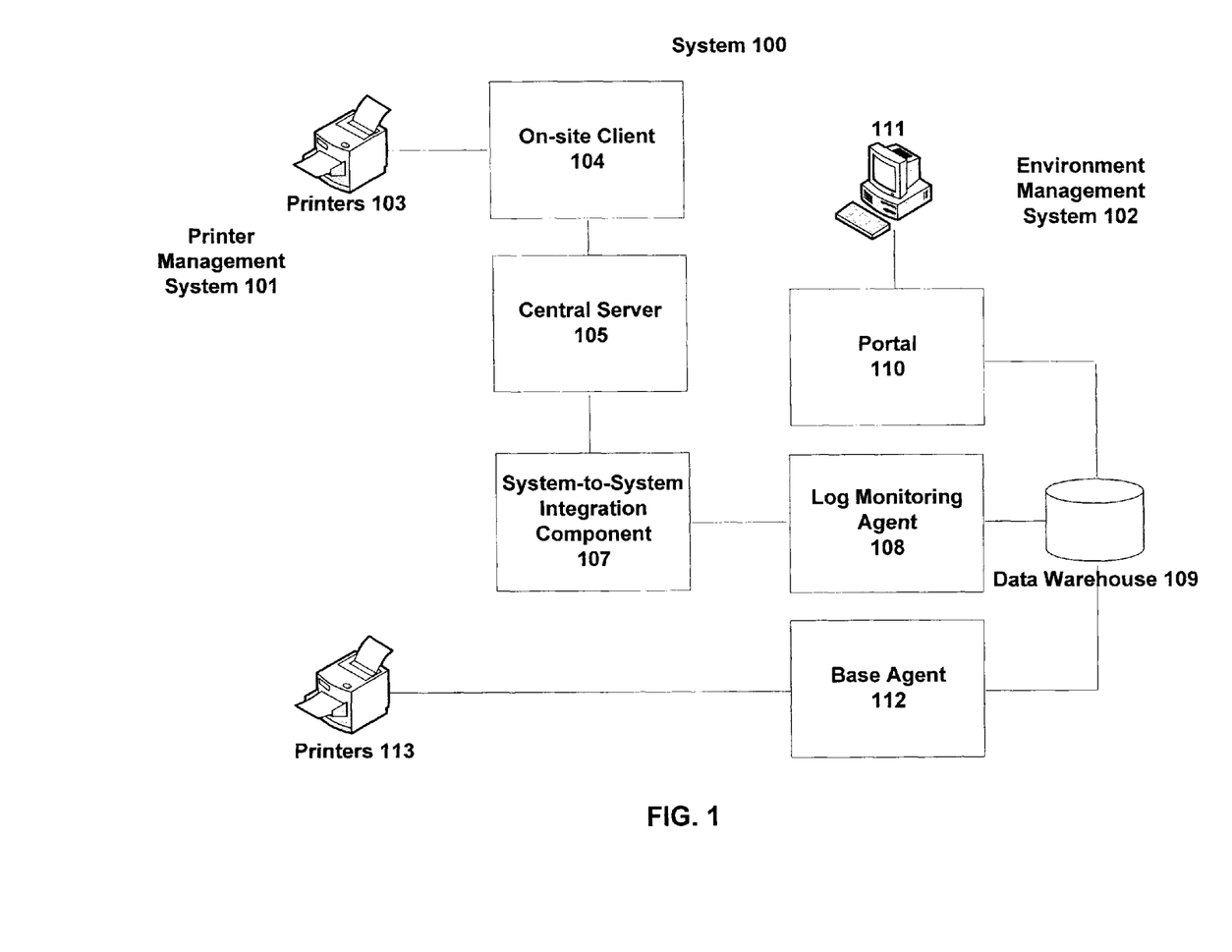
FIG. 1 shows an integrated system according to an embodiment of the present invention.

FIG. 1 shows an overall system 100 according to an embodiment. The system 100 includes a printer management system 101 and an environment management system 102 that are integrated with each other.

The printer management system 101 includes a plurality of printers 103, an on-site client 104, and a central server 105. A more detailed view of printer management system 101 is shown on FIG. 2.

Figure 2:
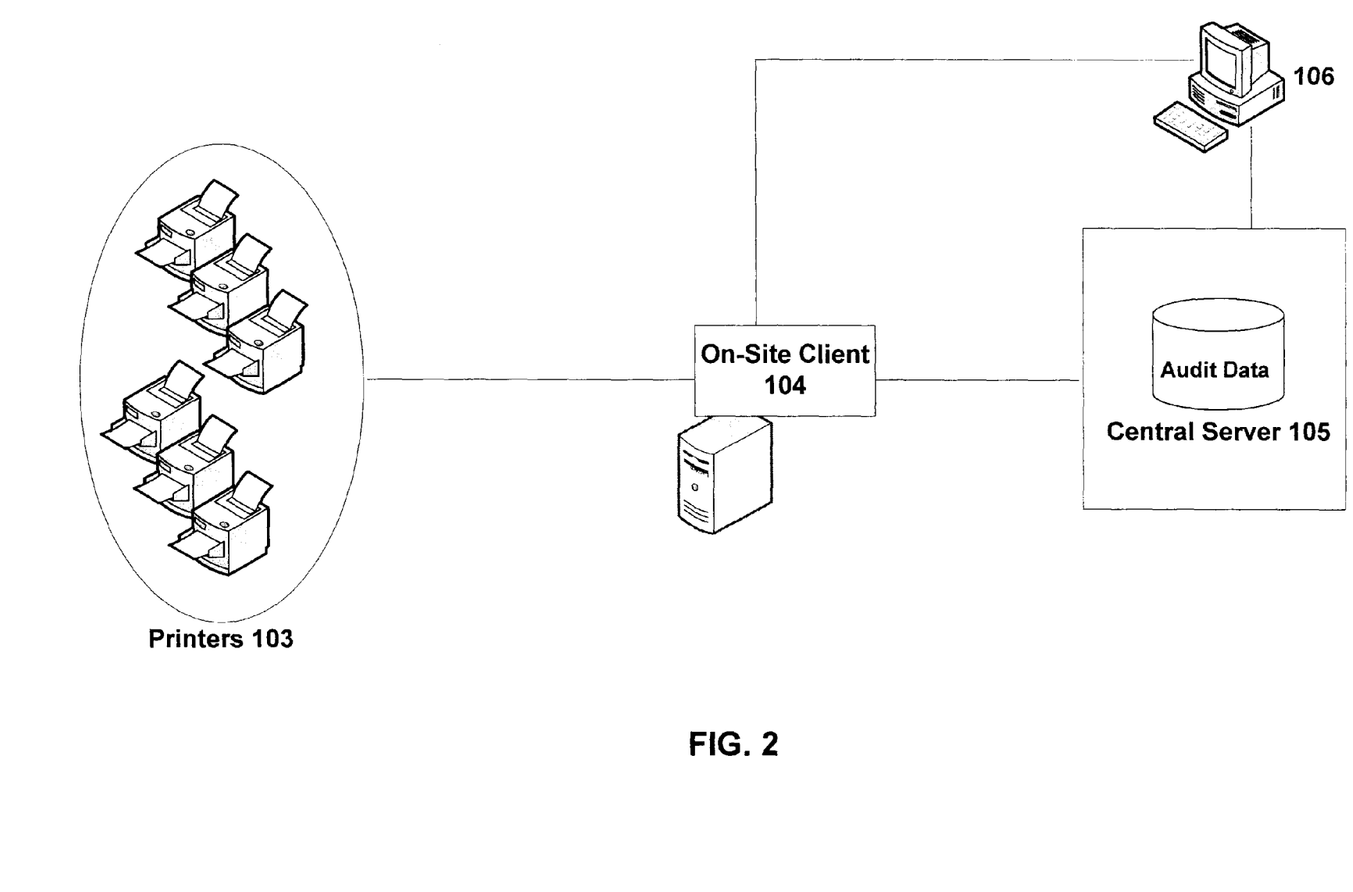
FIG. 2 shows a print management system according to an embodiment of the present invention.

In the example shown in FIG. 2, the printers 103 (also referred to as a "printer fleet") are SNMP (Simple Network Management Protocol) enabled and accessible behind routers. The printers 103 are considered printers of a first type because they do not have a management function configured for the environment management system 102. On the contrary, the printers 113 shown in FIG. 1, which will be discussed in more detail below are considered printers of a second type because they do have a management function configured for the environment management system 102.

One-time discovery of the printers 103 occurs once during system implementation and the results are stored in the on-site client 104. Subsequently, new printers added to the printer fleet are added to the discovery results on the on-site client 103. An initial discovery procedure, which is performed after the printer management system 101 is installed, may use a discovery application. The discovery procedure results in list of IP addresses of all printers discovered on the system 101. The list may be converted to spreadsheet format, and printers which are not printers of the first type may be removed from spreadsheet list. The list may be imported into the on-site client 104, which then reads data from all the printers on the printer management system 101 at predetermined time intervals (for example, every 2 hours). For any new printer added to the network (after initial discovery step described above), the on-site client 104 will collect data from these printers during a next scheduled data collection (i.e., within two hours in the example time interval above) and each collection thereafter. In the present example, the data flow from the printers 103 to the on-site client 104 is uni-directional in nature, but the present application is not limited as such.

The central server 105 shown in FIG. 2 collects and stores data from each on-site client 104 in the system. The on-site client 104 may be installed on a server. The central server 105 may be accessed, for example, by an interne browser running on a computer 106 in order to manage components of the system. In the case of integrating the printer management system 101 with the total environment management system, the management may involve simply setting up a single user account for accessing the central server 105 and any other management components. This provides the advantage that installation, configuration and maintenance of all components of the system can be performed by a single entity.

The printer management system 101 shown in FIG. 2 may be located behind a firewall. Alternatively, the overall system 100 may be located behind a firewall.

Returning to the overall system shown in FIG. 1, FIG. 1 shows that the environment management system 102 includes a system-to-system integration component 107 and a log monitoring agent 108. The system-to-system integration component 107 retrieves device data from the central server 105 located in the printer management system 101, and performs such retrieval according to a configurable refresh interval (for example, every hour). In an example, the system-to-system integration component may use an application programming interface (API) to retrieve device data from the central server 105. For example, the system-to-system integration component makes one or more web-services calls to the central server 105 based on the Simple Object Access Protocol (SOAP) to extract data from the central server 105. The data may be stored on the central server in a database format.

The log monitoring agent 108 and the system-to-system integration component 107 may be separate devices (such as separate computers) or they may be running on the same device. The log monitoring agent 108 continually monitors data from the system-to-system integration component 107. The log monitoring agent 108 sends the monitored data to a data warehouse 109, which is a data storage device as is known in the art.

A portal unit 110 retrieves the data from the data warehouse 109. The portal unit 110 provides real-time data about the printers for display on a device 111. For instance, if there is a change in the status or condition of a monitored printer, such a change will be available at the portal unit 110 with minimal delay. The portal unit 110 may be a program or application implemented on the same device (such as a computer) as the device 111 or it may be implemented on a separate device. The portal unit 110 may also be web-accessible from a remote computer, where the remote computer accesses a port on the device of the portal unit 110 and then can view the portal unit display via a web browser.

FIG. 1 also shows a base agent 112 which retrieves data from one or more printers 113. The printers 113 are of a second type, meaning that they are pre-configured with a management function to operate on the total environment management system 102, and are thus different than printers 103 of the first type on the print management system 101. An example of the management function is a management information base (MIB) that can make a web-services management (WSMan) call to the base agent. The MIB may be similar to those that are well-known in the art. In the present example, the data flow from the printers 113 to the base agent 112 is bi-directional in nature. For instance, the base agent 112 can request data from each of the printers 113, and each of the printers 113 can provide data to the base agent 112 without request via the web-services management call described above.

The base agent 112 receives data from the printers 113 and provides the data to the data warehouse 109.

Data collected regarding the printers 103 and the printers 113, may be displayed in both table and graph form in navigator views provided via the portal unit as will be described in more detail below.

For retrieving device location data, which is also displayed to a user on device 111, a data import may be done by a database administrator that populates a database table containing location data based on the device identifier.

A total time between a printer event, such as a toner status change, and the time it takes for such an event to be available for viewing at the device 111 may depend upon the audit schedule with the printer management system 101, the system-to-system integration component refresh interval and the portal history configuration time interval.

Figure 3:
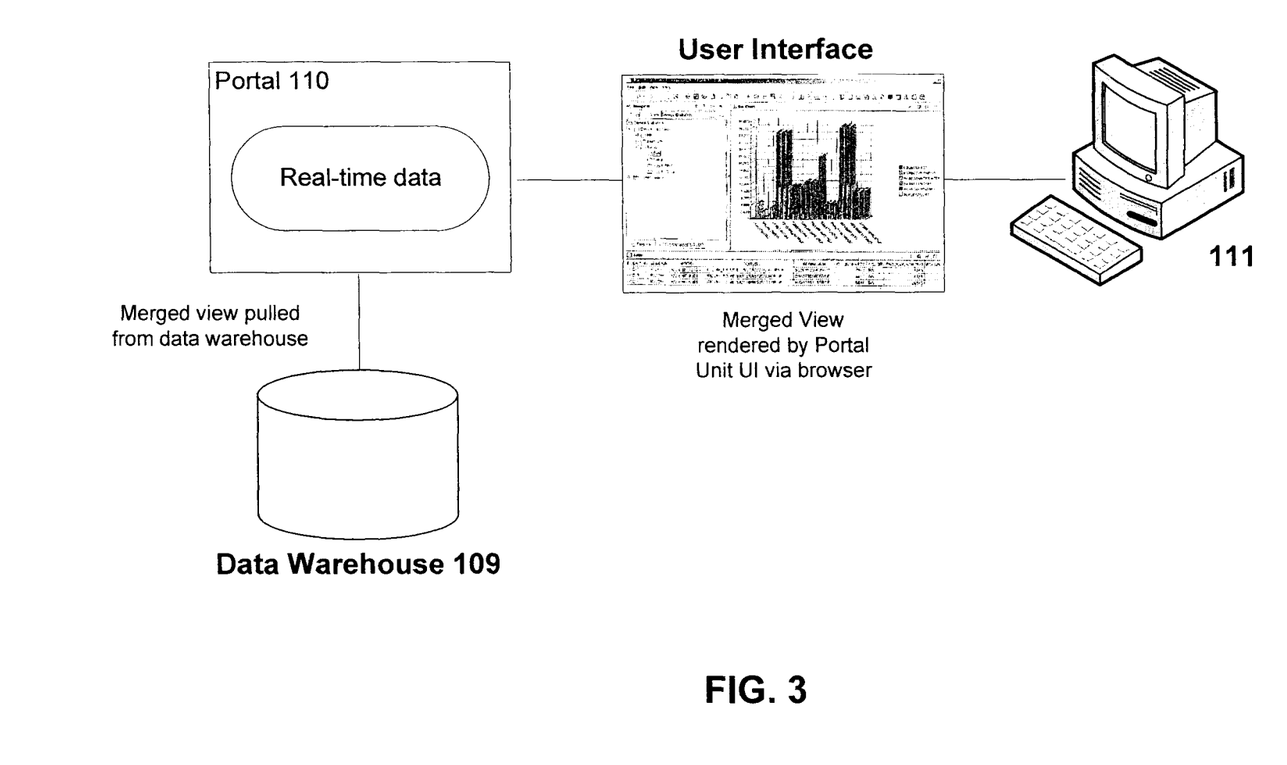
FIG. 3 shows how data flows from the data warehouse to being displayed by the portal unit

Data collected for printers 103 in the system 101 and printers 110 that are directly connected to the system 102 are merged into a common view to the end user via the portal unit. FIG. 3 shows how data flows from the data warehouse to being displayed by the portal unit.

Figure 4:
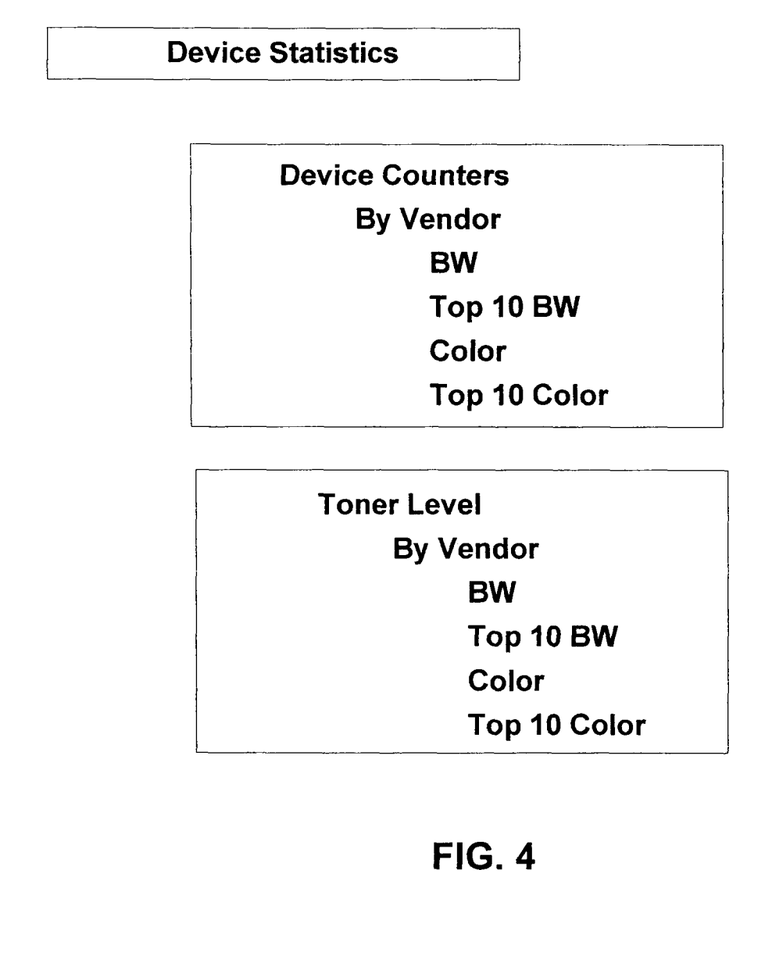
FIG. 4 shows a tree structure view hierarchy may also be available at the portal unit.

A tree-structure view hierarchy for device statistics of the printers may also be available at the portal unit. Examples of the different types of hierarchies is shown on FIG. 4. FIG. 4 shows that device statistics may be displayed based on device counters which show a total page count at each printer, and/or based on the toner level at each printer. The device statistics for each type of device statistic can further be organized based on the vendor and/or the type of printer, such as: black-and-white (BW), Top 10 BW, color, or Top 10 color.

A user input of selecting or modifying the view hierarchy may have the effect of filtering table and graph data accordingly. It is noted that the table data shown at the portal can also be sorted by location. For device location data, a data import may be performed by a database administrator that populates a database table at the data warehouse, the database table containing location data based on a device identifier (ID).

Figure 5:
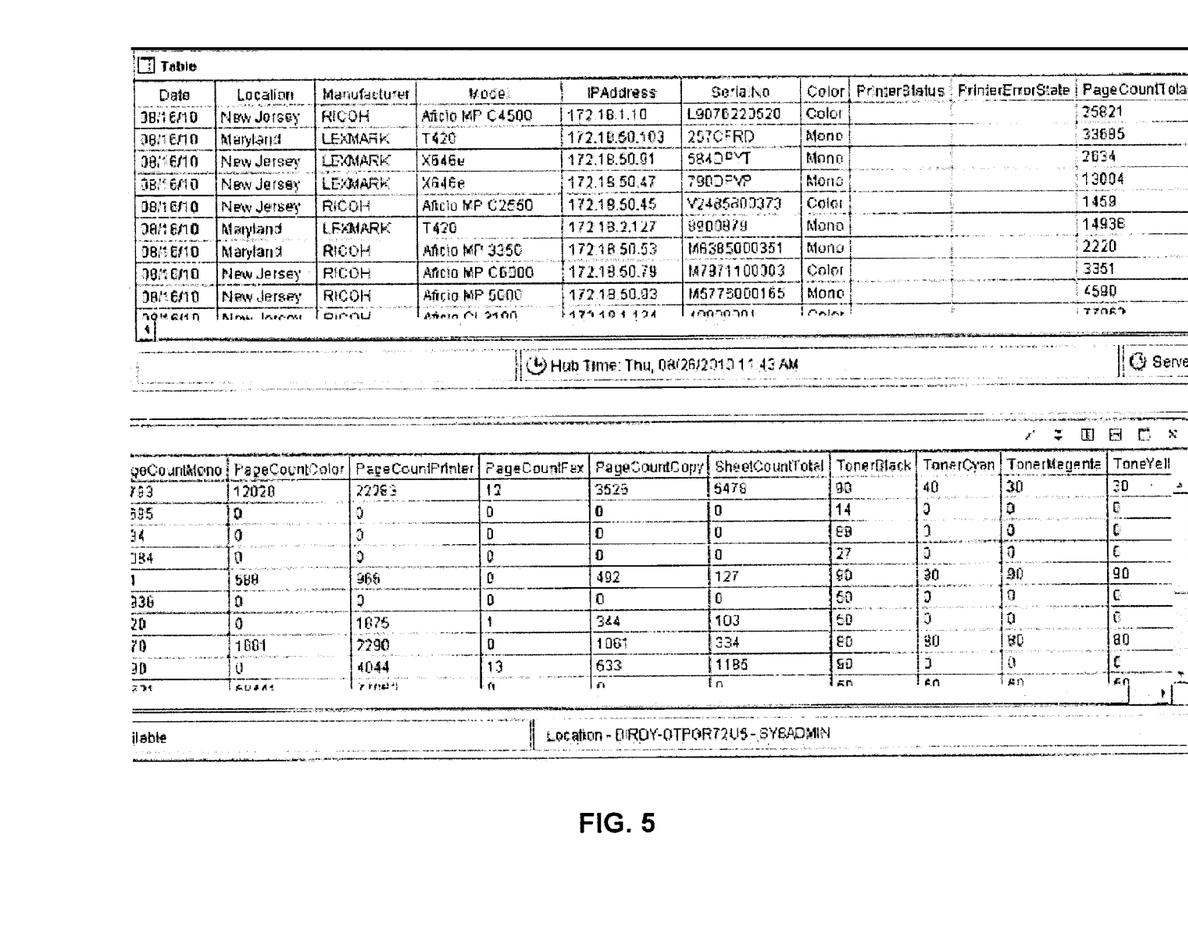
FIG. 5 shows an example screenshot of a view at the portal unit in the form of a table.

FIG. 5 shows an example screenshot of a view at the portal unit in the form of a table. The table data originates from the data warehouse. Table data is filtered by view selection and will show both first type compatible printers (printers 103) and second type compatible printers (printers 113). Table data can be sorted by clicking on any of the table's fields, enabling a quick overview of highest to lowest values or vice versa by resorting. In the above example, the database schema is the same for the data displayed for both the printers 103 and the printers 113, however, this may not always be the case. For instance, there may be more data available for the printers 113 than the printers 103, or vice versa. In such a case, there may be additional attributes of data that can be displayed for one type of printer versus another type of printer.

Figure 6:
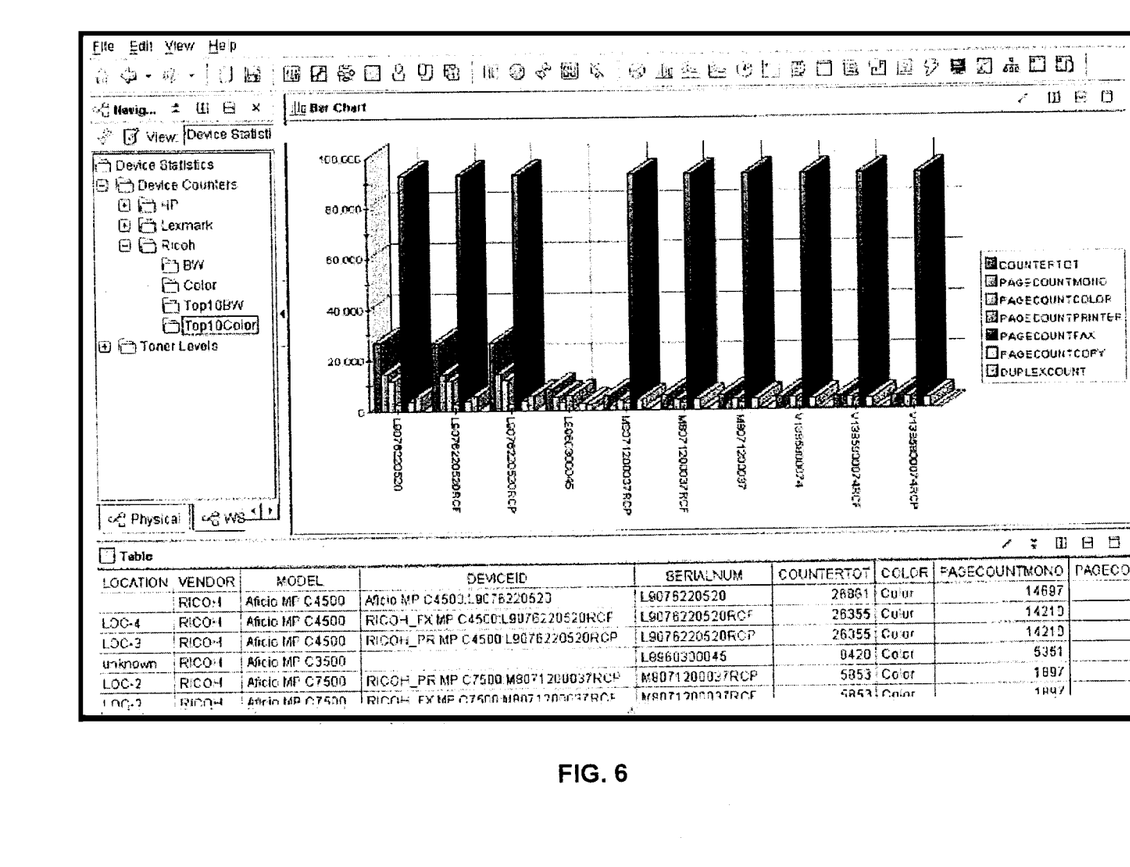
FIGS. 6-8 show example screen shots of views at the portal unit, where a graph is shown.
Figure 7:
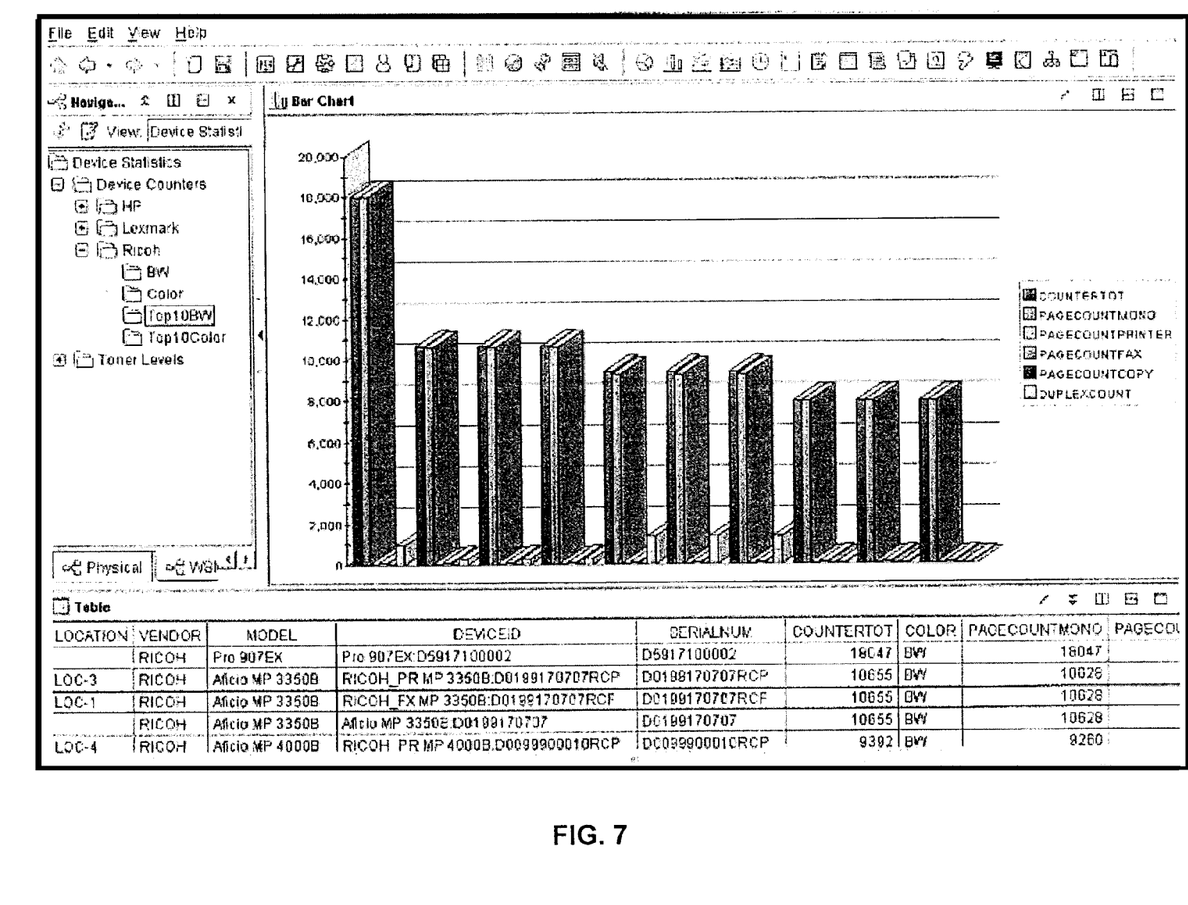
Figure 8:
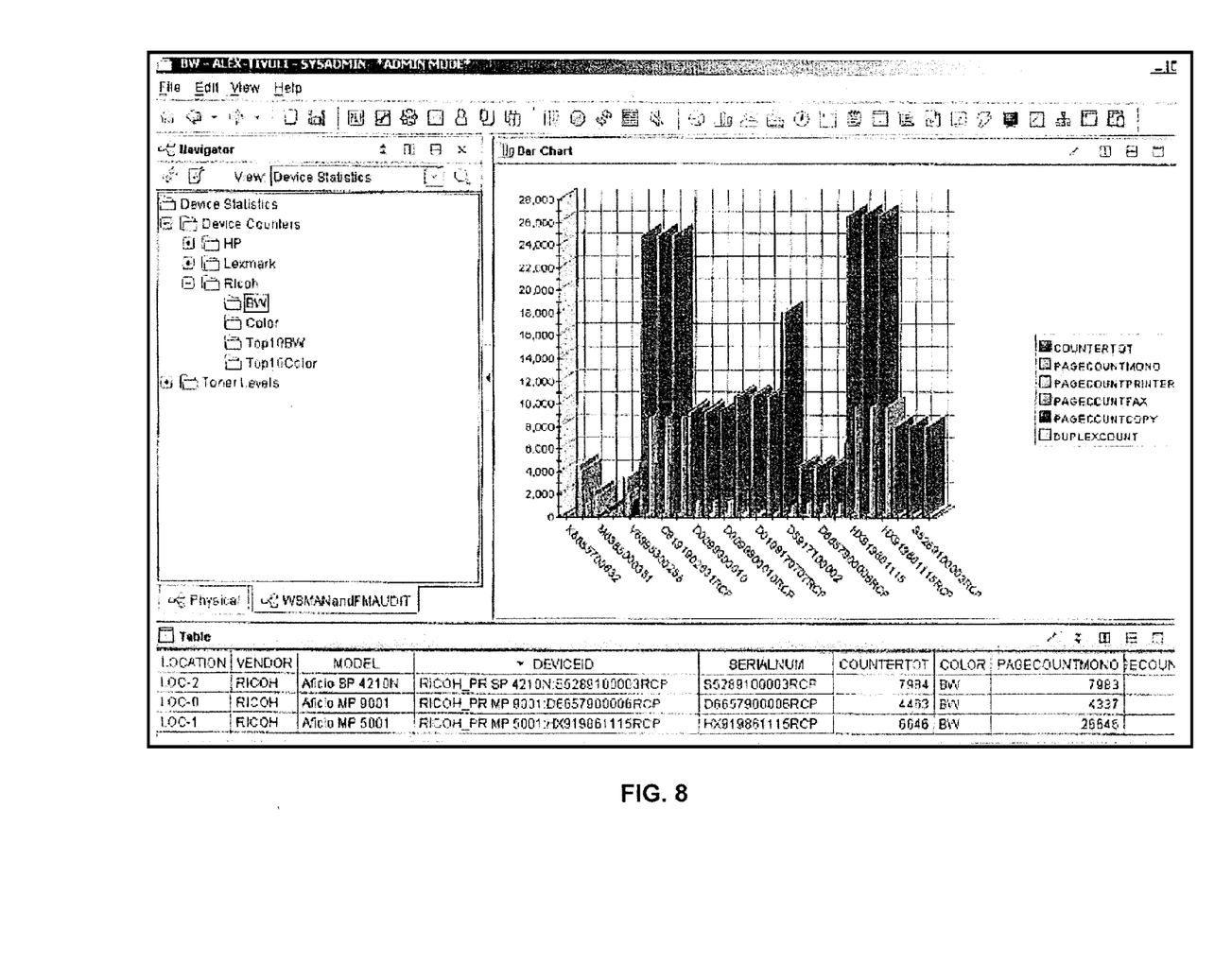

FIGS. 6, 7, and 8 show example screen shots of views at the portal unit, where a graph is shown. The graphs shown in FIGS. 6, 7, and 8 show different types of page counts for each printer for the data shown in the table below the graph. The count totals may be sorted into the following categories: total, mono, color, printer, fax, copy and duplex.

Figure 9:
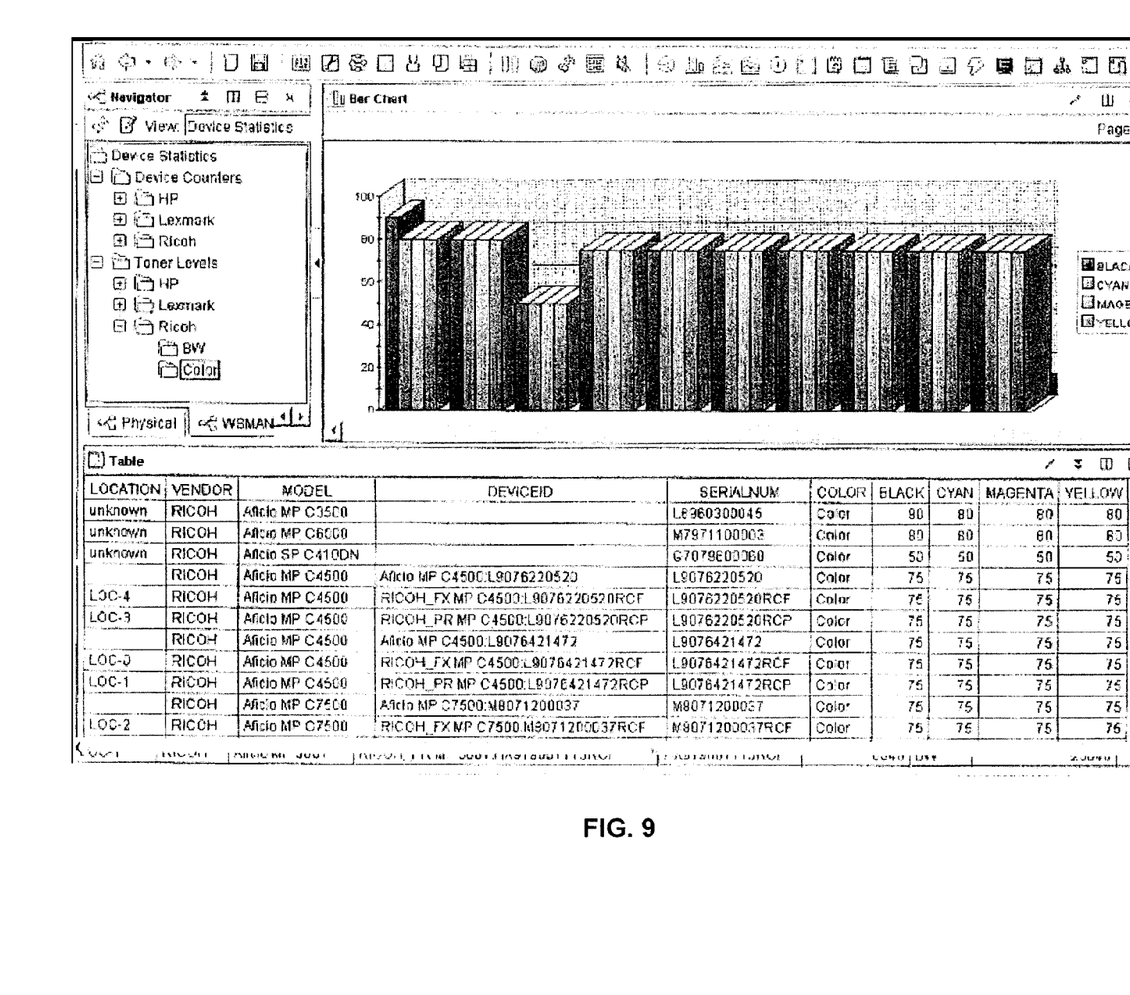
FIG. 9 shows an example screen shot of a view at the portal unit, where a graph shows toner levels for each printer.

FIG. 9 shows an example screen shot of a view at the portal unit, where a graph shows toner levels for each printer. The Y-axis represents toner level values as percentage values.

Figure 10:
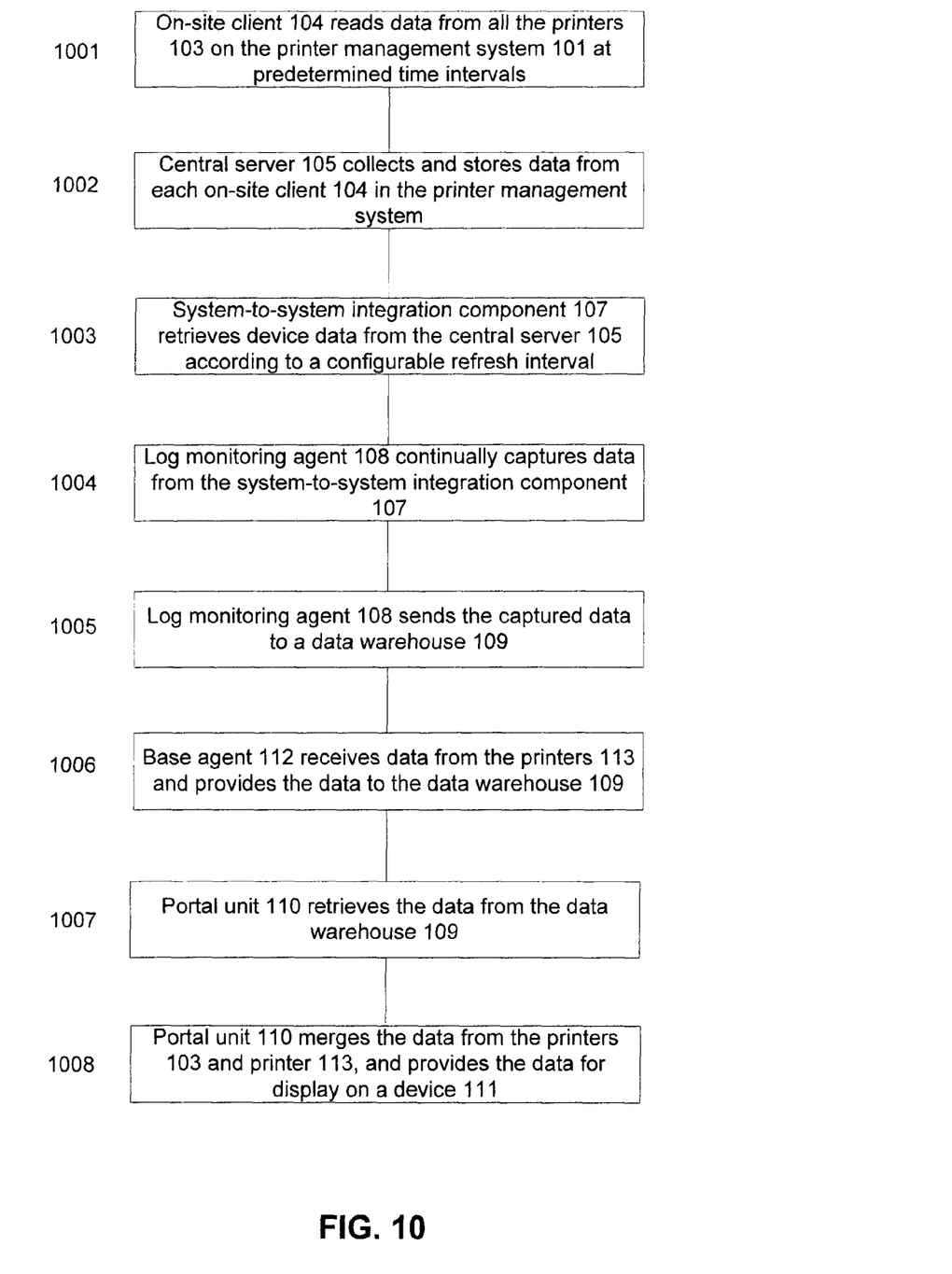
FIG. 10 shows a method performed on the system according to an embodiment.

FIG. 10 shows a method according to an embodiment which is performed on the system 100 described above.

In step 1001, the on-site client 104 reads data from all the printers 103 on the printer management system 101 at predetermined time intervals (for example, every 2 hours).

In step 1002, the central server 105 collects and stores data from each on-site client 104 in the system.

In step 1003, the system-to-system integration component 107 retrieves device data from the central server 105 located in the printer management system 101, and performs such retrieval according to a configurable refresh interval (for example, every hour).

In step 1004, the log monitoring agent 108 continually captures data from the system-to-system integration component 107.

In step 1005, the log monitoring agent 108 sends the captured data to a data warehouse 109.

In step 1006, the base agent 112 receives data from the printers 113 and provides the data to the data warehouse 109.

In step 1007, the portal unit 110 retrieves the data from the data warehouse 109.

In step 1008, the portal unit 110 merges the data from the printers 103 and printer 113, and provides the data for display on a device 111.

The above described examples describe using different devices which may be a computer or CPU. The CPU may be part of a general purpose computer, wherein the computer housing houses a motherboard which contains the CPU, memory such as DRAM (dynamic random access memory), ROM (read only memory), EPROM (erasable programmable read only memory), EEPROM (electrically erasable programmable read only memory), SRAM (static random access memory), SDRAM (synchronous dynamic random access memory), and Flash RAM (random access memory), and other special purpose logic devices such as ASICs (application specific integrated circuits) or configurable logic devices such as GAL (generic array logic) and reprogrammable FPGAs (field programmable gate arrays).

The computer may include a floppy disk drive; other removable media devices (e.g. compact disc, tape, and removable magneto optical media); and a hard disk or other fixed high density media drives, connected using an appropriate device bus such as a SCSI (small computer system interface) bus, an Enhanced IDE (integrated drive electronics) bus, or an Ultra DMA (direct memory access) bus. The computer may also include a compact disc reader, a compact disc reader/writer unit, or a compact disc jukebox, which may be connected to the same device bus or to another device bus.

The system may include at least one computer readable medium. Examples of computer readable media include compact discs, hard disks, floppy disks, tape, magneto optical disks, PROMs (e.g., EPROM, EEPROM, Flash EPROM), DRAM, SRAM, SDRAM, etc. Stored on any one or on a combination of computer readable media, the present invention includes software for controlling both the hardware of the computer and for enabling the computer to interact with a human user. Such software may include, but is not limited to, device drivers, operating systems and user applications, such as development tools.

Such computer readable media further includes the computer program product of the present invention for performing the inventive method herein disclosed. The computer code devices of the present invention can be any interpreted or executable code mechanism, including but not limited to, scripts, interpreters, dynamic link libraries, Java classes, and complete executable programs.

The invention may also be implemented by the preparation of application specific integrated circuits (ASICs) or by interconnecting an appropriate network of conventional component circuits, as will be readily apparent to those skilled in the art.

Numerous modifications and variations of the present invention are possible in light of the above teachings. It is, therefore, to be understood that within the scope of the accompanying claims, the invention may be practiced otherwise than as specifically described herein.

The invention claimed is:

1. A printing system comprising:
a print management system, including
a first type of printer, and
a printer management client device that periodically reads data about first type of printer from the first type of printer; and
an environment management system, including
an integration device that periodically retrieves the data about the first type of printer from the printer management system;
a data storage unit that receives the data about the first type of printer from the integration device; and
a second type of printer that provides data about the second type of printer to the data storage unit,
wherein the second type of printer has a management function that is configured to provide the data about the second type of printer to the data storage unit in the environment management system both upon request from an external base agent device and without request from the base agent device, and the first type of printer does not have the management function.

2. The printing system according to claim 1, further comprising:
a display device configured to merge the data about the first type of printer and the data about the second type of printer stored at the data storage unit, and display the merged data for a user.

3. The printing system according to claim 2, wherein the display device displays the merged data in the form of a table or a graph.

4. The printing system according to claim 1, wherein the data about the first type of printer and the data about the second type of printer is a page count.

5. The printing system according to claim 1, wherein the data about the first type of printer and the data about the second type of printer is a toner level.

6. The system according to claim 1, wherein the printer management client device periodically reads the data about first type of printer at a predetermined time interval.

7. The printing system according to claim 1, wherein the integration device periodically retrieves the data about the first type of printer from the printer management system at a predetermined time interval.

8. The printing system according to claim 1, wherein the management function of the second type of printer is configured to automatically provide the data about the second type of printer to the data storage unit.

9. The printing system according to claim 1, wherein the management function of the second type of printer is a management information base (MIB) configured to make a web-services management (WSMan) call to the base agent device.

10. The printing system according to claim 1, wherein the print management system is located behind a firewall.

11. A printing method implemented on a printing system including a print management system and an environment management system, comprising:
at the print management system,
periodically reading data about a first type of printer from the first type of printer; and
at the environment management system,
periodically retrieving the data about the first type of printer from the printer management system,
storing the data about the first type of printer at a data storage unit, and
at a second type of printer, providing data about the second type of printer to the data storage unit,
wherein the second type of printer has a management function that is configured to provide the data about the second type of printer to the data storage unit in the environment management system both upon request from an external base agent device and without request from the base agent device, and the first type of printer does not have the management function.

* * * * *